US011692056B2

(12) United States Patent
Burtovyy et al.

(10) Patent No.: US 11,692,056 B2
(45) Date of Patent: Jul. 4, 2023

(54) STABLE POLYCYCLOOLEFIN POLYMER AND INORGANIC NANOPARTICLE COMPOSITIONS AS OPTICAL MATERIALS

(71) Applicant: PROMERUS, LLC, Brecksville, OH (US)

(72) Inventors: Oleksandr Burtovyy, Brecksville, OH (US); Wei Zhang, Brecksville, OH (US)

(73) Assignee: PROMERUS, LLC, Akron, OH (US)

( * ) Notice: Subject to any disclaimer, the term of this patent is extended or adjusted under 35 U.S.C. 154(b) by 398 days.

(21) Appl. No.: 16/937,672

(22) Filed: Jul. 24, 2020

(65) Prior Publication Data
US 2021/0024685 A1 Jan. 28, 2021

Related U.S. Application Data

(60) Provisional application No. 62/878,383, filed on Jul. 25, 2019, provisional application No. 63/013,028, filed on Apr. 21, 2020.

(51) Int. Cl.
*C08G 61/12* (2006.01)
*C08K 3/22* (2006.01)
*B01J 31/22* (2006.01)
*C08L 65/00* (2006.01)

(52) U.S. Cl.
CPC ........ *C08G 61/122* (2013.01); *B01J 31/2278* (2013.01); *C08K 3/22* (2013.01); *C08L 65/00* (2013.01); *B01J 2531/821* (2013.01); *C08G 2261/144* (2013.01); *C08G 2261/147* (2013.01); *C08G 2261/148* (2013.01); *C08G 2261/1412* (2013.01); *C08G 2261/1422* (2013.01); *C08G 2261/1424* (2013.01); *C08G 2261/1426* (2013.01); *C08G 2261/50* (2013.01); *C08K 2003/2244* (2013.01); *C08L 2201/10* (2013.01)

(58) Field of Classification Search
CPC ............ C08G 61/122; C08G 2261/148; C08G 2261/1412; C08G 2261/1422; C08G 2261/1426; C08G 2261/147; C08G 2261/50; C08G 2261/144; B01J 31/2278; B01J 2531/821; C08L 65/00; C08K 3/22; C08K 2003/224
See application file for complete search history.

(56) References Cited

U.S. PATENT DOCUMENTS 9,328,132 B2   5/2016  Skowerski et al.
2019/0048130 A1* 2/2019  Rhodes ............... B01J 31/2273

FOREIGN PATENT DOCUMENTS

EP   2 045 280 A1   4/2009

OTHER PUBLICATIONS

Deshmukh et al., Alkene metathesis: the search for better catalyst, Dalton Transactions, 2007 vol. 24, pp. 2479-2491 (Year: 2007).*
Rossow et al., "A modular construction kit for supramolecular polymer gels." Polymer Chemistry, 2013, vol. 4, pp. 2515-2527 (Year: 2013).*
Prashant H. Deshmukh, et al., "Alkene metathesis: the search for better catalysts," Dalton Trans., 2007, vol. 24, pp. 2479-2491.
Torsten Rossow, et al., "A modular construction kit for supramolecular polymer gels," Polym. Chem., 2013, vol. 4, pp. 2515-2527.
Written Opinion of PCT/US2020/043364, dated Nov. 6, 2020; Also see WO 2021/016503 A1, dated Jan. 28, 2021.

* cited by examiner

*Primary Examiner* — Robert D Harlan
(74) *Attorney, Agent, or Firm* — Balaram Gupta

(57) ABSTRACT

Embodiments in accordance with the present invention encompass compositions encompassing a latent organo-ruthenium catalyst, an organo-ruthenium compound and a pyridine compound along with one or more monomers which undergo ring open metathesis polymerization (ROMP) when said composition is heated to a temperature from 80° C. to 150° C. or higher to form a substantially transparent film. Alternatively the compositions of this invention also undergo polymerization when subjected to suitable radiation. The monomers employed therein have a range of refractive index from 1.4 to 1.6 and thus these compositions can be tailored to form transparent films of varied refractive indices. The compositions of this invention further comprises inorganic nanoparticles which form transparent films and further increases the refractive indices of the compositions. Accordingly, compositions of this invention are useful in various opto-electronic applications, including as coatings, encapsulants, fillers, leveling agents, among others.

20 Claims, No Drawings

STABLE POLYCYCLOOLEFIN POLYMER AND INORGANIC NANOPARTICLE COMPOSITIONS AS OPTICAL MATERIALS

CROSS REFERENCE TO RELATED APPLICATIONS

This application claims the benefit of U.S. Provisional Application No. 62/878,383, filed Jul. 25, 2019 and U.S. Provisional Application No. 63/013,028, filed Apr. 21, 2020, both of which are incorporated herein by reference in their entirety.

BACKGROUND OF THE INVENTION

Field of the Invention

Embodiments in accordance with the present invention relate generally to a single component mass polymerizable polycycloolefin monomer compositions optionally in combination with inorganic nanoparticles dispersed therewith having high optical transparency and exhibiting suitable refractive index that match the refractive index of layers in optical devices, such as optical sensors, light emitting diodes (LEDs), organic light emitting diodes (OLED), among other devices. More specifically, this invention relates to single component room temperature stable compositions encompassing norbornene (NB) based olefinic monomers in which inorganic nanoparticles are optionally dispersed, which undergo mass polymerization when subjected to higher temperature conditions to form transparent optical layers having utility in a variety of opto-electronic applications including as encapsulants, coatings, fillers, and in a variety of nanoimprint lithography (NIL) materials, among other applications.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U.S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

U.S. Pat. No. 9,944,818, issued Apr. 17, 2018, discloses a two component mass polymerizable composition which is capable of tailoring to the desirable refractive index and is suitable as a filler and a protective coating material, thus potentially useful in the fabrication of a variety of OLED devices. Although this approach may provide certain advantages it still suffers from the drawback of being two component system and in addition organic polymers alone may not be able to provide required high refractive index for the OLED applications. Furthermore, there is also a need for mass polymerizable compositions which are stable at room temperature for several days as well as OLED fabrication conditions and yet polymerize instantly when subjected to suitable higher temperatures and/or photolytic conditions.

Accordingly, there is still a need for filler materials that complement the refractive index of OLEDs and yet exhibit high transparency and good thermal properties, among other desirable properties. In addition, it is desirable that such organic filler materials readily form a permanent protective coatings and are available as a single component composition for dispensing with such OLED layers, among other applications as described herein.

Thus, it is an object of this invention to provide organic/inorganic nanoparticle composite materials that overcome the gaps faced by the art. More specifically, it is an object of this invention to provide a single component composition that will mass polymerize under the conditions of the fabrications of an OLED device (or any other desirable device). It is further an object of this invention to provide stable single component mass polymerizable composition with no change in viscosity at or below normal storage conditions but which undergoes mass polymerization only under the process conditions in which the OLED device (or other suitable device) is finally fabricated, such as for example by the use of radiation and/or thermal process.

Other objects and further scope of the applicability of the present invention will become apparent from the detailed description that follows.

SUMMARY OF THE INVENTION

Surprisingly, it has now been found that by employing a single component filler composition, it is now possible to fabricate an OLED device (or any other device of choice) having a transparent optical layer which features hitherto unachievable properties, i.e., refractive index in the range of 1.4 to 1.8 or higher, high colorless optical transparency, desirable film thickness of the filler layer typically in the range of 10 to 20 μm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically or thermally treated at less than 100° C., adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 35° C. for several hours to several days, and undergo mass polymerization only above 80° C. or higher temperature or under photolytic conditions. The compositions cure very quickly when subjected to higher than 80° C. and generally the compositions are cured in less than one hour. Most importantly, the compositions of this invention exhibit excellent shelf life stability in that the compositions of this invention retain their initial viscosity for several days. That is, for at least five to ten days.

Advantageously, the compositions of this invention are also compatible with a "one drop fill" (commonly known as "ODF"). In a typical ODF process, which is commonly used to fabricate a top emission OLED device, a special optical fluid is applied to enhance the transmission of light from the device to the top cover glass, and the fluid is dispensed by an ODF method. Although the method is known as ODF which can be misleading because several drops or lines of material are generally dispensed inside the seal lines. After applying the fluid, the fluid spreads out as the top glass is laminated, analogous to die-attach epoxy. This process is generally carried out under vacuum to prevent air entrapment. The present invention allows for a material of low viscosity which readily and uniformly coats the substrate with rapid flow in a short period of time. Even more advantageously, the present invention overcomes the deficiencies faced by the prior art in that a single component composition is much more convenient than employing a two component system especially in an ODF method.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen.

The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentalodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "$(C_1-C_6)$alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "$(C_1-C_4)$acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, —$CO_2H$, an ester, an amide, $(C_1-C_6)$ alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "latent organo-transition metal catalyst" is meant organo-transition metal compounds that show little or no catalytic activity at a particular (usually ambient atmospheric conditions) temperature and initiate such activity either upon heat or light or both. Generally the catalytic activity of the catalyst can be kept latent for a prolonged periods of time, which can range from five days or longer especially when it is stored at room temperature or lower in a dark atmosphere. Higher temperatures and/or light may accelerate the catalytic activity.

By the term "derived" is meant that the polymeric repeating units are polymerized (formed) from, for example, polycyclic norbornene-type monomers in accordance with formulae (I) or (IV) wherein the resulting polymers are ring opened metathesis polymerized (ROMP), for example, the 2,3 double bond of norbornene-type monomers are ring opened and polymerized as shown below:

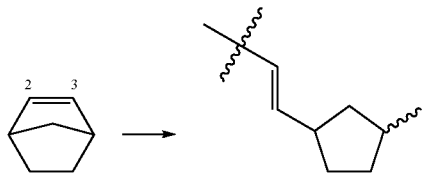

Accordingly, in accordance with the practice of this invention there is provided a single component composition encompassing a) one or more monomers of formula (I):

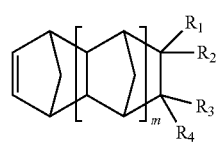

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched $(C_3-C_{16})$alkyl, perfluoro$(C_1-C_{12})$alkyl, hydroxy$(C_1-C_{16})$alkyl, $(C_3-C_{12})$cycloalkyl, $(C_6-C_{12})$bicycloalkyl, $(C_7-C_{14})$tricycloalkcyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl, tri$(C_1-C_6)$alkoxysilyl and a group of formula (A):

—Z-Aryl (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$, $(CR_5R_6)_a$—$(CO)$—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;

Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;

b) an organo-ruthenium compound of the formula (II):

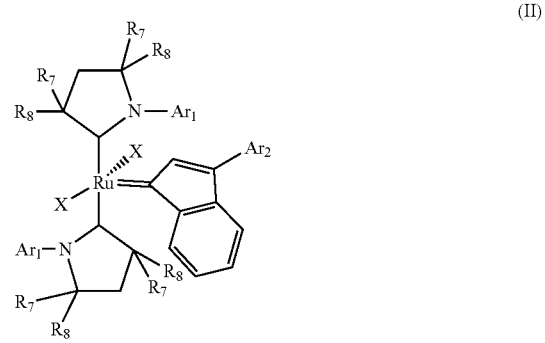

(II)

wherein

X is a halogen selected from the group consisting of chlorine, bromine and iodine;

$R_7$ and $R_8$ are the same or different and each independently selected from the group consisting of methyl, ethyl, isopropyl, sec-butyl, tert-butyl, substituted or unsubstituted cyclohexyl, substituted or unsubstituted phenyl, substituted or to unsubstituted biphenyl and substituted or unsubstituted naphthyl; or $R_7$ and $R_8$ taken together with the carbon atom to which they are attached to form a $(C_3-C_7)$carbocyclic ring optionally containing one or more heteroatoms selected from the group consisting of nitrogen, oxygen and sulfur;

$Ar_1$ and $Ar_2$ are the same or different and each independently selected from the group consisting of substituted or unsubstituted phenyl, substituted or unsubstituted biphenyl and substituted or unsubstituted naphthyl;

c) an organo-ruthenium compound of formula (III):

$$((R_9)_3P)_3RuCl_2 \quad (III)$$

wherein $R_9$ is selected from the group consisting of substituted or unsubstituted phenyl and substituted or unsubstituted cyclohexyl; and d) a compound of formula (IV) or a compound of formula (V):

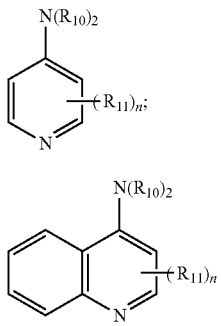

wherein n is an integer from 0 to 4;

each $R_{10}$ is independently selected from the group consisting of methyl, ethyl, n-propyl, iso-propyl, n-butyl, iso-butyl and tert-butyl;

$R_{11}$ is selected from the group consisting of methyl, ethyl, linear or branched $(C_3-C_6)$alkyl, $(C_6-C_{10})$aryl, methoxy, ethoxy, linear or branched $(C_3-C_6)$alkoxy, $(C_6-C_{10})$aryloxy and halogen;

wherein said substituents are selected from the group consisting of methyl, ethyl, iso-propyl, tert-butyl and phenyl; and wherein said monomer of formula (I) is having a refractive index of at least 1.5 and said composition is in a clear liquid form at room temperature.

As used herein the Aryl may further include the following:

substituted or unsubstituted biphenyl of formula:

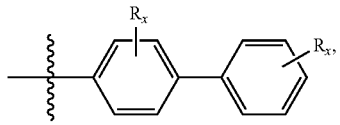

substituted or unsubstituted naphthyl of formula:

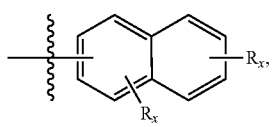

substituted or unsubstituted terphenyl of formula:

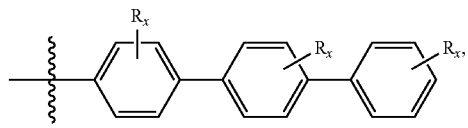

substituted or unsubstituted anthracenyl of formula:

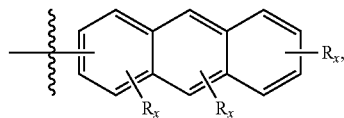

substituted or unsubstituted fluorenyl of formula:

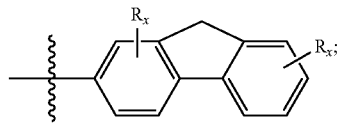

where $R_x$ in each occurrence is independently selected from methyl, ethyl, linear or branched $(C_3-C_{12})$alkyl or $(C_6-C_{10})$aryl.

As noted, the monomer of formula (I) is having a refractive index of at least 1.5. The composition is in a clear liquid form at room temperature. Surprisingly, as noted above, the compositions of this invention are stable at or below room temperature thus offering excellent shelf life stability. As used herein, "stable" means the composition of this invention remains clear without increase of any viscosity when kept at or below room temperature especially when kept in a dark atmosphere, such as for example, in amber colored containers in the absence of any light. Accordingly, in some embodiments, the composition of this invention exhibits no viscosity change when stored at temperatures below 35° C. for a period of at least four (4) days or more. Accordingly, in some embodiments, the composition of this invention exhibits less than two (2) percent viscosity increase when stored at temperatures below 35° C. for a period of at least four (4) days. In some other embodiments, the composition of this invention exhibits less than ten (10) percent viscosity change when stored at temperatures below 35° C. for a period of four (4) days to ten (10) days.

The monomers employed in the composition of this invention are themselves known in the literature or can be prepared by any of the known methods in the art to make such or similar types of monomers.

In addition, the monomers as described herein readily undergo mass polymerization, i.e., in their neat form without use of any solvents when polymerized under mass ring open metathesis polymerization (ROMP) conditions using certain transition metal catalysts, such as for example, organo-ruthenium and organo-osmium compounds. See for example, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., *Angew. Chem. Int. Ed,* 2006, 45, 3760-3765. Also, see U.S. Pat. No. 6,838,489, pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the latent catalyst and/or the activator or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the catalyst, activator and/or monomers can be employed in this invention. Examples of such solvents include alkanes, cycloalkane, toluene, THF, dichloromethane, dichloroethane, and the like.

Advantageously, it has now been found that one or more of the monomers themselves can be used to dissolve the latent catalyst as well as the activator and thus avoiding the need for the use of solvents. In addition, one monomer can itself serve as a solvent for the other monomer and thus eliminating the need for an additional solvent. For example, if first monomer of formula (I) is a solid at room temperature, then the second monomer of formula (I), which is liquid at room temperature can be used as a solvent for the first monomer of formula (I) which is a solid or vice versa. Therefore, in such situations more than one monomer can be employed in the composition of this invention.

Accordingly, it has now been surprisingly found that monomers of formula (I) serve as high refractive index materials imparting high refractive index to the resulting polymeric film upon mass polymerization at a temperature and/or condition different from the application of the composition onto a desirable substrate. In general, the monomers of formula (I) which are suitable in this invention feature a refractive index of at least 1.5. In some embodiments the refractive index of the monomers of formula (I) is higher than 1.5. In some other embodiments the refractive index of the monomers of formula (I) is in the range from about 1.5 to 1.6. In yet some other embodiments the refractive index of the monomers of formula (I) is higher than 1.55, higher than 1.6 or higher than 1.65. In some other embodiments it may even be higher than 1.7.

In general, the composition of this invention exhibits low viscosity, which can be below 100 centipoise or higher. In some embodiments, the viscosity of the composition of this invention is less than 90 centipoise. In some other embodiments the viscosity of the composition of this invention is in the range from about 10 to 100 centipoise. In yet some other embodiments the viscosity of the composition of this invention is lower than 80 cP, lower than 60 cP, lower than 40 cP, lower than 20 cP. In some other embodiments it may even be lower than 10 cP.

When the composition of this invention contains two or more monomers, for example, they can be present in any desirable amounts that would bring about intended benefit, including either refractive index modification or viscosity modification or both. Accordingly, the molar ratio of first monomer of formula (I) to second monomer of formula (II) can be from 1:99 to 99:1. In some embodiments, the molar ratio of first monomer of formula (*second monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than two different monomers of formula (I) are employed, any ratios of such monomers can be used that would bring about the intended result.

In general, the compositions in accordance with the present invention encompass the above described one or more of the monomer of formula (I) and if needed additional monomers of formula (I) distinct from each other, as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinctive monomers of formula (I) makes it possible to tailor a composition having the desirable refractive index, viscosity and optical transmission properties. In addition, as described further herein it may be desirable to include other polymeric or monomeric materials, such as for example, inorganic nanoparticles which are compatible to provide desirable optical properties depending upon the end use application. Accordingly, the compositions of this invention can also include other high refractive polymeric materials and/or nanoparticles which will bring about such intended benefit. Examples of such polymers include without any limitation, poly(α-methylstyrene), poly(vinyl-toluene), copolymers of α-methylstyrene and vinyl-toluene, and the like. Examples of nanoparticles are described further in detail below.

Advantageously, it has further been found that the compositions of this invention can also contain additional monomers. In some embodiments, the composition according to this invention may further contain one or more monomers selected from monomer of formula (VI).

The monomer of formula (VI) is:

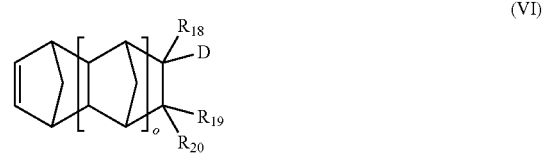

(VI)

wherein:
o is an integer from 0 to 2, inclusive;
D is $SiR_{21}R_{22}R_{23}$ or a group selected from:

$$—(CH_2)_c—O—SiR_{21}R_{22}R_{23} \quad (E);$$

$$—(CH_2)_c—SiR_{21}R_{22}R_{23} \quad (F); \text{ and}$$

$$—(SiR_{21}R_{22})_c—O—SiR_{21}R_{22}R_{23} \quad (G); \text{ wherein}$$

c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;

$R_{18}$, $R_{19}$ and $R_{20}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{21}$, $R_{22}$ and $R_{23}$ are each independently of one another methyl, ethyl, linear or branched $(C_3-C_9)$alkyl, substituted or unsubstituted $(C_6-C_{14})$aryl, methoxy, ethoxy, linear or branched $(C_3-C_9)$alkoxy or substituted or unsubstituted $(C_6-C_{14})$aryloxy.

In this aspect of the invention, it has now been found that monomers of formula (VI) provide further advantages.

Namely, the monomers of formula (VI) depending upon the nature of the monomer may impart high or low refractive index to the composition, thus it can be tailored to meet the need. In addition, the monomers of formula (VI) generally improve the adhesion properties and thus can be used as "adhesion modifiers." Finally, the monomers of formula (VI) may exhibit low viscosity and good solubility for the latent catalyst and/or activator, among various other advantages.

Accordingly, any of the monomers within the scope of monomer of formula (I) can be employed in the composition of the invention. Representative examples of monomer of formula (I) include the following without any limitations:

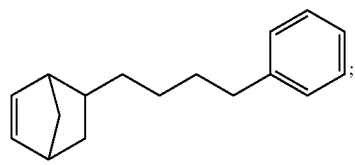

5-(4-phenylbutyl)bicyclo[2.2.1]hept-2-ene

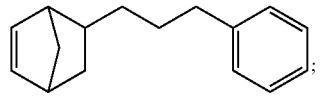

5-(3-phenylpropyl)bicyclo[2.2.1]hept-2-ene

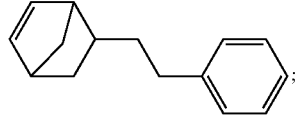

5-phenethylbicyclo[2.2.1]hept-2-ene (PENB)

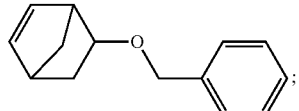

5-(benzyloxy)bicyclo[2.2.1]hept-2-ene

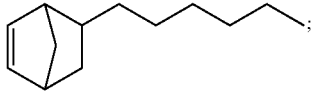

5-hexylbicyclo[2.2.1]hept-2-ene (HexylNB)

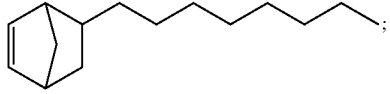

5-octylbicyclo[2.2.1]hept-2-ene (OctNB)

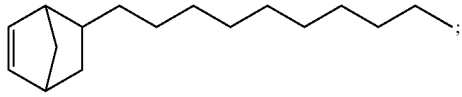

5-decylbicyclo[2.2.1]hept-2-ene (DecNB)

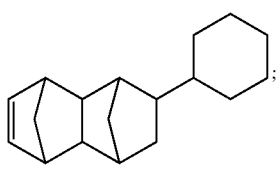

2-cyclohexyl-tetracyclododecene (CyclohexylTD)

-continued

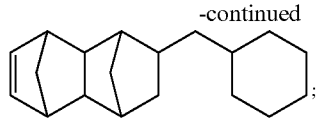

2-cyclohexylmethyl-1,2,3,4,4a,5,8,8a-octahydro-1,4:5,8-dimethanonaphthalene

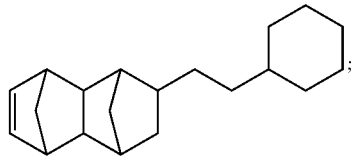

2-cyclohexylethyl-1,2,3,4,4a,5,8,8a-octahydro-1,4:5,8-dimethanonaphthalene

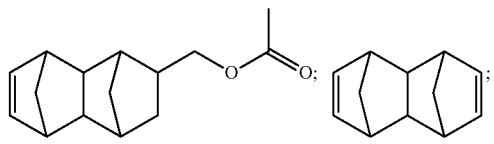

(1,2,3,4,4a,5,8,8a-octahydro-1,4:5,8-dimethanonaphthalen-2-yl) methyl acetate (TDMeOAc)

tetracyclododecadiene (TDD)

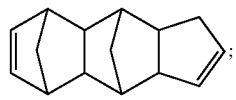

3a,4,4a,5,8,8a,9,9a-octahydro-1H-4,9:5,8-dimethanocyclopenta[b]naphthalene
(one of trimers of cyclopentadiene, CPD3, also known as TCPD1)

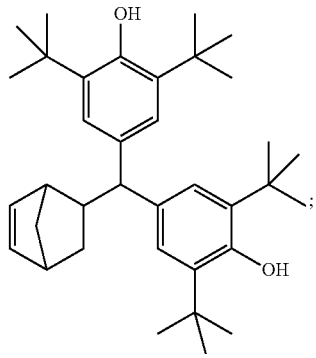

4,4'-(bicyclo[2.2.1]hept-5-en-2-ylmethylene)bis(2,6-di-tert-butylphenol) (AOAONB)

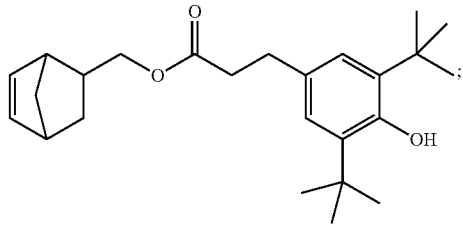

bicyclo[2.2.1]hept-5-en-2-ylmethyl 3-(3,5-di-tert-butyl-4-hydroxyphenyl)propanoate (AONB)

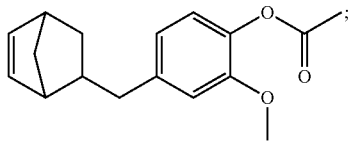

5-norbornenylmethyleugenyl acetate (EuAcNB)

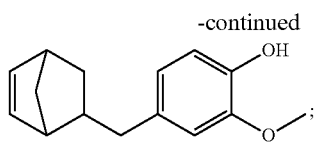

5-norbornenylmethyleugenol (EuOHNB)

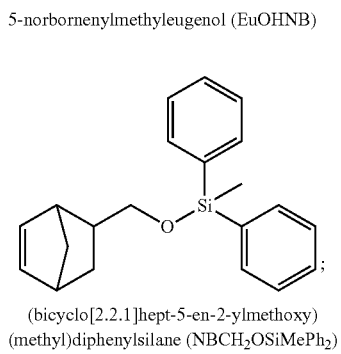

(bicyclo[2.2.1]hept-5-en-2-ylmethoxy)
(methyl)diphenylsilane (NBCH₂OSiMePh₂)

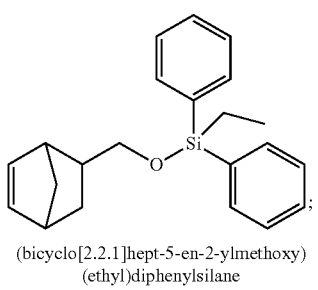

(bicyclo[2.2.1]hept-5-en-2-ylmethoxy)
(ethyl)diphenylsilane

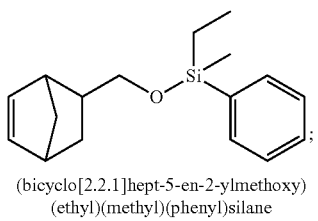

(bicyclo[2.2.1]hept-5-en-2-ylmethoxy)
(ethyl)(methyl)(phenyl)silane

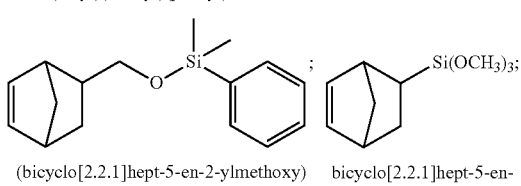

(bicyclo[2.2.1]hept-5-en-2-ylmethoxy)
dimethyl(phenyl)silane bicyclo[2.2.1]hept-5-en-2-yltrimethoxysilane (TMSNB)

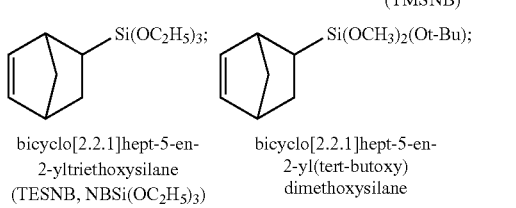

bicyclo[2.2.1]hept-5-en-2-yltriethoxysilane (TESNB, NBSi(OC₂H₅)₃)

bicyclo[2.2.1]hept-5-en-2-yl(tert-butoxy)dimethoxysilane

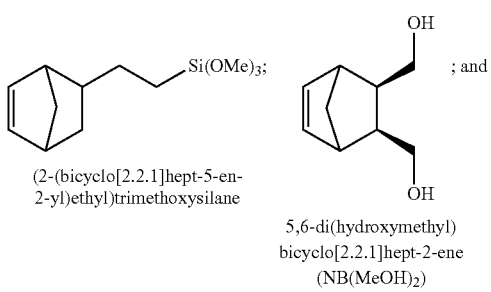

(2-(bicyclo[2.2.1]hept-5-en-2-yl)ethyl)trimethoxysilane 5,6-di(hydroxymethyl)bicyclo[2.2.1]hept-2-ene (NB(MeOH)₂)

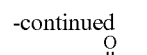

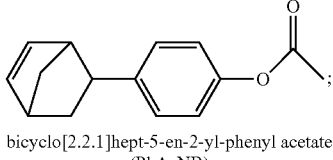

bicyclo[2.2.1]hept-5-en-2-yl-phenyl acetate (PhAcNB)

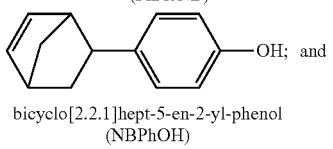

bicyclo[2.2.1]hept-5-en-2-yl-phenol (NBPhOH)

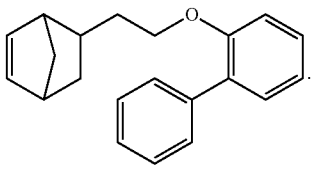

5-(2-([1,1'-biphenyl]-2-yloxy)ethyl)bicyclo[2.2.1]hept-2-ene (NBEtOPhPh)

In a further embodiment of this invention, the composition contains any of the latent catalyst that would bring about the mass polymerization as described herein under ROMP conditions. Generally, such suitable latent catalysts include a number of known organo-transition metal complexes, such as organo-ruthenium or organo-osmium compounds, among others. Again, as used herein the term "latent" means that the organo-ruthenium catalysts used in the composition of this invention remain inactive for a prolonged period of time when the composition of this invention is stored below ambient conditions, such as for example, below 35° C. Accordingly, in some embodiments the organo-ruthenium catalysts remain latent for a period of at least four (4) days or more when stored at temperatures below 35° C. In some other embodiments, the organo-ruthenium catalysts remain latent for a period of four (4) days to ten (10) days when stored at temperatures below 35° C.

Generally, any of the latent organo-ruthenium catalyst of formula (II) that would bring about ring open metathesis polymerization of the monomers of formula (I) can be employed in the composition of this invention. More specifically, organo-ruthenium compounds that show little or no activity at ambient temperatures can be employed. That is, the latent catalysts that are stable at or near room temperature are more suitable in the composition of this invention. As noted, the latent catalysts may be activated by a variety of conditions, including without any limitation thermal, acid, light and chemical activation. The chemical activation may include use of thermal acid generator or photo acid generators.

Several of the latent catalysts that are suitable to be employed in the compositions of this invention are known in the literature or can be readily made by any of the known procedures in the art. See for example, Grubbs, et al., Organometallics, 2011, 30 (24): 6713-6717; Sutar et al., Angew. Chem. Int. Ed. 2016, 55, 764-767; Leitgeh, et al., Monatsh Chem (2014) 145:1513-1517; van Hensbergen, et al., J. Mater. Chem. C. 2015, 3, 693-702; Grubbs, et al., J. Am. Chem. Soc., 2009, 131, 203802039; Zak, et al., Eur. J. Inorg. Chem., 2014, 1131-1136; Gawin, et al., ACS Catal. 2017, 7, 5443-5449. Further examples of such catalysts can also be found in U.S. Pat. No. 9,328,132, pertinent portions of which are incorporated herein by reference.

Accordingly, in some embodiments, the composition of this invention contains an organo-ruthenium compound of formula (II), wherein:

X is chlorine;

$R_7$ and $R_8$ are the same or different and each independently selected from the group consisting of methyl, ethyl, isopropyl and cyclohexyl; or $R_7$ and $R_8$ taken together with the carbon atom to which they are attached to form a cyclopentyl, cyclohexyl or cycloheptyl ring;

$Ar_1$ and $Ar_2$ are the same or different and each independently selected from the group consisting of phenyl, 2,6-dimethylphenyl, 2,6-diethylphenyl, 2,6-di(isopropyl)phenyl and 2,4,6-trimethylphenyl.

Accordingly, a few of the exemplary latent catalysts, which are within the scope of organo-ruthenium compounds of formula (II), without any limitation maybe selected from the group consisting of:

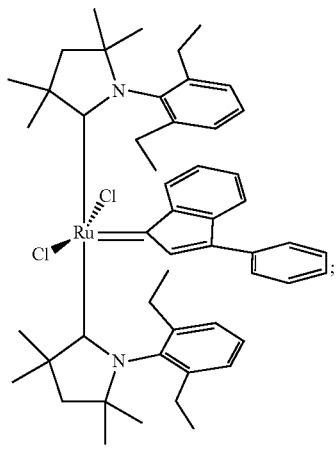

bis(1-(2,6-diethylphenyl)-3,3,5,5-
tetramethylpyrrolidin-2-yl)
(3-phenyl-1H-inden-1-
ylidene)ruthenium(VI) chloride

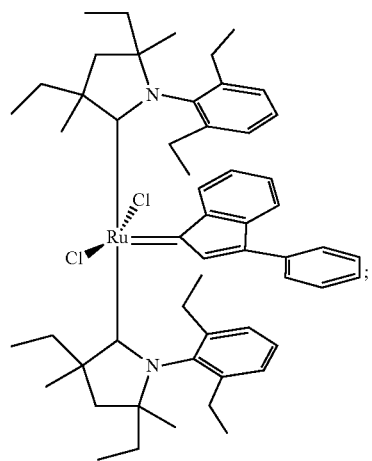

((3R,5R)-1-(2,6-diethylphenyl)-3,5-diethyl-3,5-
dimethylpyrrolidin-2-yl)((3S,5S)-1-(2,6-
diethylphenyl)-3,5-diethyl-3,5-
dimethylpyrrolidin-2-yl)((E)-3-phenyl-
1H-inden-1-ylidene)ruthenium(VI) chloride

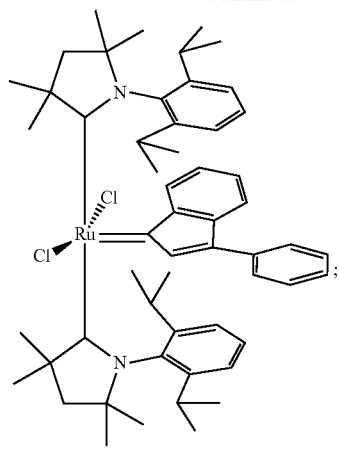

bis(1-(2,6-diisopropylphenyl)-3,3,5,5-
tetramethylpyrrolidin-2-yl)
(3-phenyl-1H-inden-1-
ylidene)ruthenium(VI) chloride

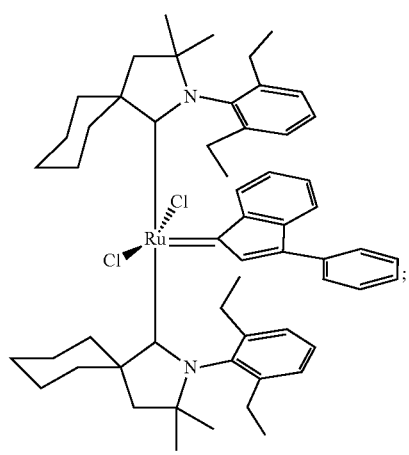

bis(2-(2,6-diethylphenyl)-3,3-dimethyl-2-azaspiro
[4.5]decan-1-yl)(3-phenyl-1H-inden-1-
ylidene)ruthenium(VI) chloride

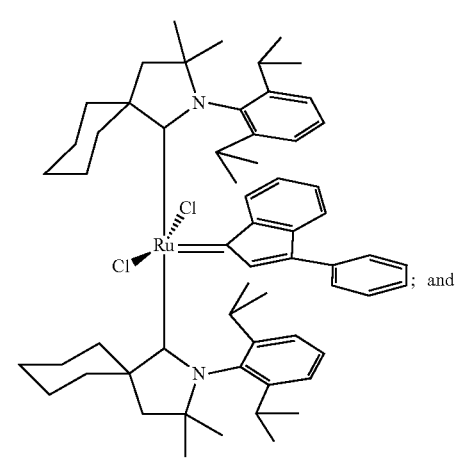

; and bis(2-(2,6-diisopropylphenyl)-3,3-dimethyl-2-azaspiro
[4.5]decan-1-yl)(3-phenyl-1H-inden-1-
ylidene)ruthenium(VI) chloride

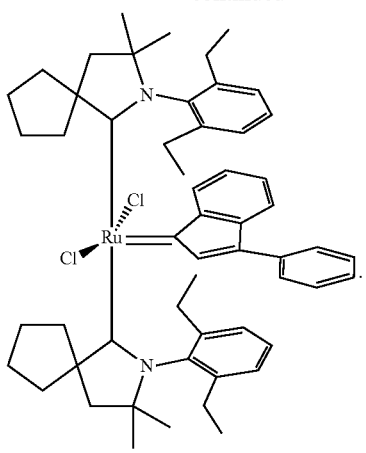

bis(2-(2,6-diethylphenyl)-3,3-dimethyl-2-azaspiro
[4.4]nonan-1-yl)(3-phenyl-1H-inden-1-
ylidene)ruthenium(VI) chloride In some embodiments, the composition of this invention contains a compound of formula (III), wherein: $R_9$ is selected from the group consisting of phenyl, 4-methylphenyl, 4-ethylphenyl, 4-isopropylphenyl, 2,4-dimethylphenyl, 2,4,6-trimethylphenyl, cyclohexyl and 4-methylcyclohexyl.

Non-limiting examples of such organo-ruthenium compound of formula (III) maybe selected from the group consisting of:

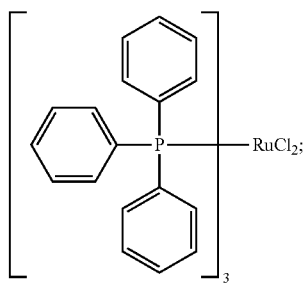

dichlorotris(triphenylphosphine)ruthenium(II)

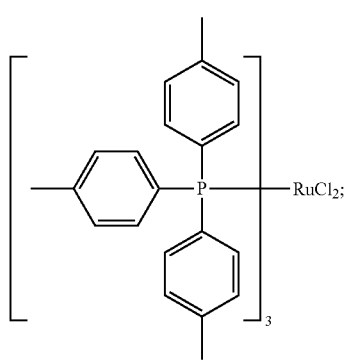

dichlorotris(tri-4-methylphenylphosphine)ruthenium(II)

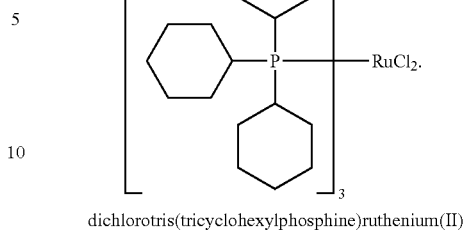

dichlorotris(tricyclohexylphosphine)ruthenium(II)

As noted, the composition of this invention also contains a compound of formula (IV) or a compound of formula (V). Any of the compounds within the scope of compounds of formula (IV) or (V) can be used in the composition of this invention. In some embodiments the composition of this invention contains a compound of formula (IV) or a compound of formula (V), wherein:

n is an integer from 0 to 2;
each $R_{10}$ is independently selected from the group consisting of methyl, ethyl, iso-propyl and tert-butyl; and
$R_{11}$ is selected from the group consisting of methyl, ethyl, iso-propyl, tert-butyl, phenyl, methoxy, ethoxy, phenoxy, fluorine and chlorine.

Non-limiting examples of a compound of formula (IV) or a compound of formula (V) are selected from the group consisting of:

N,N-dimethylpyridin-4-amine;
N,N-diethylpyridin-4-amine;
N,N-diisopropylpyridin-4-amine;
N,N-di-tert-butylpyridin-4-amine;
N,N-dimethyl-2-methylpyridin-4-amine;
N,N-di-tert-butyl-2-methylpyridin-4-amine;
2-methoxy-N,N-dimethylpyridin-4-amine;
2-fluoro-N,N-dimethylpyridin-4-amine;
N,N-dimethylquinolin-4-amine;
N,N,2-trimethylquinolin-4-amine;
2-methoxy-N,N-dimethylquinolin-4-amine; and
2-chloro-N,N-dimethylquinolin-4-amine.

In another aspect of this invention there is further provided a composition as described herein which includes a dispersion of nanoparticles. In this aspect of the invention it has now been surprisingly found that there is no need to add a compound of formula (III) as described herein, and can be optional if needed. That is, in this aspect of the invention the composition encompasses one or more monomer of formula (I), the organo-ruthenium compound of formula (II) as described herein, a compound of formula (IV) or a compound of formula (V) and a dispersion of nanoparticles. This composition when subjected to higher temperature, such as for example from about 80° C. to about 100° C. or higher undergoes mass ring open-metathesis polymerization (ROMP) to form a transparent film.

Any of the nanoparticles known in the literature that would bring about such a change can be used in this aspect of the invention. For example, U.S. Pat. No. 8,592,511 discloses certain nanoparticles that are suitable for this aspect of the invention, pertinent portion of which is incorporated herein by reference. Accordingly, such nanoparticles include without any limitation at least one of hafnium oxide, zirconium oxide, titanium oxide, hafnium-zirconium oxide and titanium-zirconium oxide.

In some embodiments of this invention it has now been found that various zirconium oxide nanoparticles are suitable to form the composition of this invention which readily forms transparent films as disclosed herein.

As noted, surprisingly, it has now been found that employing a suitable combination of a compound of formula (II), a compound of formula (IV) or a compound of formula (V), and dispersion of nanoparticles can trigger the mass polymerization of the monomers when the composition is subjected to either an elevated temperature or to a suitable radiation.

Any amount of organo-ruthenium compound of formula (II) can be employed in the composition of this invention which will bring about the intended result. Generally, the molar ratio of monomer:compound of formula (II) is in the range of 10,000:1 to 5,000:1 or lower. In some other embodiments such molar ratio of monomer:compound of formula (II) is 15,000:1, 20,000:1 or higher.

Similarly, any amount of compound of formula (III) can be employed in the composition of this invention which will bring about the intended result. Generally, the molar ratio of compound of formula (II):compound of formula (III) is in the range of 1:5 or higher. In some other embodiments such molar ratio of compound of formula (II): compound of formula (III) is 1:2, 1:2.5, 1:3, and so on.

Any amount of a compound of formula (IV) or a compound of formula (V) can be employed in the composition of this invention which will bring about the intended result. Generally, the molar ratio of compound of formula (II): compound of formula (IV) or (V) is in the range of 1:50 or higher. In some other embodiments such molar ratio of compound of formula (II):compound of formula (IV) or (V) is 1:10, 1:15, 1:20, 1:25, 1:30, 1:40, and so on.

Again, as noted, when nanoparticles are employed then there may not be a need to use a compound of formula (III). However, in some embodiments a compound of formula (III) is used as an optional additive in the compositions containing the dispersed nanoparticles as described herein.

Advantageously, it has further been found that the composition according to this invention forms a substantially transparent film when mass polymerized, generally, at a temperature from 80° C. to 100° C. or higher, for example, 150° C. or 200° C. and so on. That is to say, that when the composition of this invention is heated to certain elevated temperature, the monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that any temperature that is suitable to carry out this mass polymerization can be employed, such as for example, 80° C. to 100° C. as indicated above. However, any temperature below 80° C. or higher than 100° C. can also be employed. In some embodiments the temperature employed is 50° C., 60° C., 70° C., 80° C., 90° C. or higher than 120° C.

In some other embodiments the composition of this invention undergoes mass polymerization when exposed to suitable UV irradiation to form a substantially transparent film.

In yet other embodiments the composition of this invention undergoes mass polymerization when exposed to suitable UV irradiation at a temperature from 50° C. to 100° C. to form a substantially transparent film.

In another embodiment of this invention, the composition of this invention encompasses 5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(2-(2,6-diethylphenyl)-3,3-dimethyl-2-azaspiro[4.5]decan-1-yl)(3-phenyl-1H-inden-1-ylidene)ruthenium(VI) chloride, dichlorotris(triphenylphosphine)ruthenium(II) and N,N-dimethylpyridin-4-amine.

In yet another embodiment of this invention, the composition of this invention encompasses 5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(1-(2,6-diethylphenyl)-3,3,5,5-tetramethylpyrrolidin-2-yl)(3-phenyl-1H-inden-1-ylidene)ruthenium(VI) chloride, dichlorotris(triphenylphosphine)ruthenium(II) and N,N-dimethylpyridin-4-amine.

In yet another embodiment of this invention, the composition of this invention encompasses 5-phenethylbicyclo[2.2.1]hept-2-ene (PENB), 5-norbornenylmethyl-eugenol (EuOHNB), bis(2-(2,6-diethylphenyl)-3,3-dimethyl-2-azaspiro[4.5]decan-1-yl)(3-phenyl-1H-inden-1-ylidene)ruthenium(VI) chloride, N,N-dimethylpyridin-4-amine and zirconia nanoparticles having a size distribution less than 20 nm.

In a further aspect of this invention there is provided a kit for forming a substantially transparent film. There is dispensed in this kit a composition of this invention. Accordingly, in some embodiments there is provided a kit in which there is dispensed one or more monomers of formula (I), an organo-ruthenium compound of formula (II), a compound of formula (III), and a compound of formula (IV) or (V). However, it should be noted that a compound of formula (III) can be optional.

Accordingly, in some embodiments of this invention the kit according to this invention contains one or more monomers of formula (I), a organo-ruthenium compound of formula (II), and a compound of formula (IV) or (V).

In yet some other embodiments the kit according to this invention contains one or more monomers of formula (I), a organo-ruthenium compound of formula (II), and a compound of formula (IV) or (V), and a dispersion of nanoparticles as described herein.

In some embodiments, the aforementioned kit encompasses two or more monomers of formula (I) distinct from one another as described hereinabove. In some other embodiments the kit of this invention encompasses at least two monomers wherein first monomer facilitates dissolution of the second monomer and/or the latent catalyst and the additives as described hereinabove. Any of the monomers of formula (I) as described herein can be used in this embodiment. The molar ratio of first and the second monomer of formula (I) contained in these components can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed more than two monomers of formula (I), each distinct from one another. Further, as noted the first monomer of formula (I) is completely soluble in the second monomer of formula (I) to form a clear solution at room temperature. In some embodiments the monomer mixture may become a clear solution at slightly elevated temperature, such as for example, 30° C. or 40° C. or 50° C., before they undergo mass polymerization. In another aspect of this embodiment of this invention the composition of this invention undergoes mass polymerization at a temperature of from 50° C. to 100° C. for a sufficient length of time to form a polymeric film. That is to say that the composition of this invention is poured onto a surface or onto a substrate which needs to be encapsulated, and heated to a temperature of 50° C. to 100° C. in order for the monomers to undergo polymerization to form a solid transparent polymer which could be in the form of a transparent film. Generally, as already noted above, such polymerization can take place at 50° C., 60° C., 70° C., 80° C., 90° C., 100° C. or higher. The heating can also be carried out in stages to trigger the polymerization, for example to 60° C. for 5 minutes, and then heating to 70° C. for 15 minutes and so on. By practice of this invention it is now possible to obtain polymeric films on such substrates which are substantially transparent film. The "substantially transparent film" as used herein means that the films formed from the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments, the kit as described herein encompasses a composition, which contains 5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(2-(2,6-diethylphenyl)-3,3-dimethyl-2-azaspiro[4.5]decan-1-yl)(3-phenyl-1H-inden-1-ylidene)ruthenium(VI) chloride, dichlorotris(triphenylphosphine)ruthenium(II) and N,N-dimethylpyridin-4-amine.

In yet another embodiment of this invention, the kit as described herein encompasses a composition of this invention encompasses 5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(1-(2,6-diethylphenyl)-3,3,5,5-tetramethylpyrrolidin-2-yl)(3-phenyl-1H-inden-1-ylidene)ruthenium (VI) chloride, dichlorotris(triphenylphosphine)ruthenium(II) and N,N-dimethylpyridin-4-amine.

In yet another embodiment of this invention, the kit as described herein encompasses a composition of this invention encompasses 5-phenethylbicyclo[2.2.1]hept-2-ene (PENB), 5-norbornenylmethyl-eugenol (EuOHNB), bis(2-(2,6-diethylphenyl)-3,3-dimethyl-2-azspiro[4.5]decan-1-yl)(3-phenyl-1H-inden-1-ylidene)ruthenium(VI) chloride, N,N-dimethylpyridin-4-amine and zirconia nanoparticles having a size distribution less than 20 nm.

In yet another aspect of this invention there is further provided a method of forming a substantially transparent film for the fabrication of a variety of optoelectronic device comprising:

forming a homogeneous clear composition comprising one or more monomers of formula (I), an organo-ruthenium compound of formula (II), a compound of formula (III), a compound of formula (IV) or (V), and optionally a dispersant containing nanoparticles as described herein. However, it should be noted that a compound of formula (III) can be optional especially when a dispersant containing nanoparticles are employed;

coating a suitable substrate with the composition or pouring the composition onto a suitable substrate to form a film; and heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 100° C. for about 1 to 60 minutes, although other appropriate temperatures and times can be used. In some embodiments the substrate is baked at a temperature of from about 60° C. to about 90° C. for 2 minutes to 10 minutes. In some other embodiments the substrate is baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided a optically transparent film obtained by the mass polymerization of the composition as described herein. In another embodiment there is also provided an optoelectronic device comprising the transparent film of this invention as described herein.

In some other embodiments the compositions of this invention can also be thermally patterned or photopatterned by image-wise exposing the compositions of this invention to a suitable radiation or heat. Similarly, the compositions of this invention are also useful for forming photo or thermal imprint of a suitable substrate. That is, the composition of this invention can be employed in a variety of photo or thermal induced nanoimprint lithography (NIL). For example, a patterned digital video disk (DVD) can be replicated by pouring onto such exposed patterned DVD a composition of this invention and then subjecting the coated surface to a suitable radiation or heat. Upon such exposure the solidified film can be peeled off from the substrate which will have a reproduction of the original disk as fully described in specific example that follows.

Accordingly, in some embodiments the composition of this invention undergoes mass polymerization when exposed to suitable temperatures, generally from about 90° C. to about 300° C., or to suitable UV irradiation. The thermal treatment can be from few minutes to several minutes. For example, in some embodiments the thermal treatment can range from about 30 minutes to 2 hours. In some other embodiments such thermal curing to form the imprints are carried out for a period of 45 minutes to 90 minutes at a temperature of 100° C. to 250° C. The solidified polymer in the form of a film (thickness ranging from about 1 micron to 100 microns), a thin or thick layer (thickness ranging from about 0.1 millimeter to 10 millimeters) or any other three dimensional form of varied sizes is substantially free of any monomer or volatile oligomeric product. The resulting solid form takes the shape of the substrate and/or can be photopatterned by imagewise exposure and developing the image formed therefrom. In some embodiments the solid form is thermally imprinted taking the shape of the substrate upon which the imprint is formed.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
PENB-5-phenethylbicyclo[2.2.1]hept-2-ene; NBEtOPhPh-5-(2-([1,1'-biphenyl]-2-yloxy)ethyl)bicyclo[2.2.1]hept-2-ene; EuOHNB-5-norbornenylmethyl-eugenol; Ru-I-bis(2-(2,6-diethylphenyl)-3,3-dimethyl-2-azaspiro[4.5]decan-1-yl)(3-phenyl-1H-inden-1-ylidene)ruthenium (VI) chloride; Ru-II-bis(1-(2,6-diethylphenyl)-3,3,5,5-tetramethylpyrrolidin-2-yl)(3-phenyl-1H-inden-1-ylidene)ruthenium(VI) chloride; Complex A-dichlorotris (triphenylphosphine)ruthenium(II); DMAP-N,N-dimethylpyridin-4-amine; TGA-thermogravimetric analysis.

Various monomers as used herein are either commercially available or can be readily prepared following the procedures as described in the co-pending U.S. patent application Ser. No. 15/253,980, filed Sep. 1, 2016.

The following Examples demonstrate that the compositions of this invention are quite stable at 35° C. for several days and can very readily be mass polymerized by heating to a temperature as specified below.

Example 1

Mass Polymerization of PENB/NBEtOPhPh

In a glass bottle 1, Ru-I (1 molar part), Complex A (2.5 molar part) and DMAP (20 molar parts) were dissolved in a mixture of PENB and NBEtOPhPh (10 g, PENB:NBEtOPhPh=22:78 mole ratio, 17,000 molar parts) to form a clear solution. A portion of the solution was then heated to 100° C. for 1 hour. The solution turned to a solid indicating that it was fully polymerized, as confirmed by TGA. The residue percentage from isothermal TGA (1 hour at 100° C.) after heat treatment was >99.5%. Viscosity of the unheated solution did not change in 4 days at 35° C. The residue percentage from isothermal TGA (1 hour at 100° C.) after 4 days at 35° C. and heat treatment was >99.5%. This indicates that Ru-I in combination with DMAP and Complex A provides latency during storage while maintaining excellent reactivity at elevated temperature. Refractive index of the film formed from this composition after heating at 100° C. for one hour was 1.61 (at 589 nm).

Example 2

Mass Polymerization of PENB/NBEtOPhPh

The procedure of Example 1 was substantially repeated in Example 2, except for employing 0.5 molar parts of Ru-I, 1.25 molar parts of Complex A, and 10 molar parts of DMAP. The viscosity of the solution increased from 100 cP to 104 cP in four days at 35° C. The residue percentage from isothermal TGA (1 hour at 100° C.) at day 0 was 99.25%. The solution was kept at 35° C. for four days and the residue percentage from isothermal TGA was >99.45%. This again demonstrates that the composition of this invention is stable at 35° C. for at least four days and can be readily mass polymerized by heating to 100° C.

Example 3

Mass Polymerization of PENB/EuOHNB/$ZrO_2$ nanoparticles

A mixture of PENB and EuOHNB (5 g, 50:50 mole ratio, 44,000 molar parts) was dissolved in 50 wt. % $ZrO_2$ nanoparticles (smaller than 20 nm, PCPG-50-ETA Pixelligent) solution in ethyl acetate (10 g). The solvent was stripped off using a rotary evaporator at 60° C. (10 torr) to give a clear and transparent solution of $ZrO_2$ nanoparticles dispersed in PENB/EuOHNB. Refractive index of the solution was measured using Abbe refractometer and was 1.61 (at 589 nm). Ru-I (1 molar part) and DMAP (40 molar parts) were dissolved in the nanoparticle solution by sonicating for 1 hour at r.t. The reaction mixture was heated for 1 hour at 100° C. The residue percentage from isothermal TGA (1 h at 100° C.) after heat treatment was >99.0%. Viscosity of the solution changed only from 120 to 140 cP in 4 days at 35° C. The residue percentage from isothermal TGA (1 h at 100° C.) after 4 days at 35° C. and heat treatment was >99.5% This indicates that Ru-I in combination with DMAP provides latency during storage while maintaining excellent reactivity at elevated temperature. Refractive index of a film made with such composition was 1.64 (at 589 nm). The inorganic residue of cured samples was measured at 55 wt. % by dynamic TGA at 600° C. in air.

Example 4

Mass Polymerization of PENB/EuOHNB/$ZrO_2$ Nanoparticles

The procedures of Example 3 were substantially repeated in this Example 4 except for employing 50 wt. % $ZrO_2$ nanoparticles (smaller than 20 nm, PCPG-50-ETA Pixelligent) solution in ethyl acetate (40 g) resulting in a $ZrO_2$ nanoparticles loading of 80 wt. %. The refractive index of a film made from this composition was 1.75 (at 589 nm).

Examples 5-6

Mass Polymerization of EuOHNB/$ZrO_2$ Nanoparticles

The procedures of Example 3 were substantially repeated in these Examples 5 and 6 except for employing EuOHNB (5 g) only with $ZrO_2$ nanoparticles having a loading of 50% in Example 5 (10 g of 50 wt. % solution) and a loading of 65% in Example 6 (15.4 g of 50 wt. % solution). The refractive indices of the films made from these compositions were respectively 1.77 for the composition of Example 5 and 1.86 for the composition of Example 6 (at 589 nm).

Examples 7-9

UV-NIL of PENB/EuOHNB/$ZrO_2$ Nanoparticle Composition

The patterned portion of a digital video disk (DVD, Verbatim) is separated using a razor blade and cleaned with methanol to expose the channel patterned surface. The compositions as formed in Examples 3, 5, or 6 are then poured on a glass substrate and covered with the exposed channel patterned surface of the DVD facing the solution. The sandwiched glass substrate and the DVD is then heated to 100° C. and maintained at that temperature for one hour, during which time the film will cure and harden. The cured film can then be peeled off from the DVD and the glass substrate. The peeled film can be characterized by optical microscopy. Generally, the patterns on the film will be substantially same as that of the original patterned DVD.

Comparative Examples 1-2

The procedure of Example 1 was substantially repeated in these Comparative Examples 1 and 2, except for employing 1 molar parts of Ru-II and 2.5 molar parts of Complex A in Comparative Example 1, and 0.5 molar parts of Ru-II and 1.25 molar parts of Complex A in Comparative Example 2. No DMAP was used in either of these Comparative Examples 1 and 2. The viscosity change at 35° C. after four days and the TGA results are summarized in Table 1.

TABLE 1

| Comp. Example No. | Viscosity change at 35° C. for 4 days, cP | TGA (1 h at 100° C.), day 0 (day 4) bulk Residue % |
|---|---|---|
| 1 | 100 → 370 | 99.92 (100) |
| 2 | 100 → 570 | 99.64 (99.99) |

It is evident from the data presented in Table 1 that in the absence of DMAP the compositions of this invention are not stable and readily undergo mass polymerization even at temperatures as low as 35° C.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:
1. A composition comprising:
a) one or more monomers of formula (I):

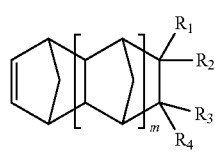

(I)

wherein:
m is an integer 0, 1 or 2;
$R_1$, $R_2$, $R_3$ and $R_4$ are the same or different and each independently selected from the group consisting of hydrogen, halogen, methyl, ethyl, linear or branched $(C_3-C_{16})$alkyl, perfluoro$(C_1-C_{12})$alkyl, hydroxy$(C_1-C_{16})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl, tri$(C_1-C_6)$alkoxysilyl and a group of formula (A):

—Z-Aryl (A)

wherein:
Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$, $(CR_5R_6)_a$—$(CO)$—$(CR_5R_6)_b$, where a and b are integers which may be the same or different and each independently is 1 to 12;
$R_5$ and $R_6$ are the same or different and each independently selected from the group consisting of hydrogen, methyl ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;
Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;
b) an organo-ruthenium compound of formula (II):

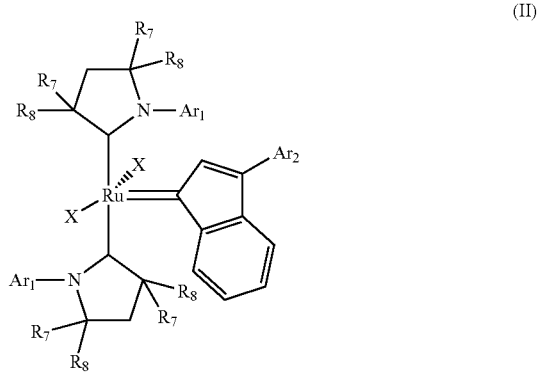

(II)

wherein
X is a halogen selected from the group consisting of chlorine, bromine and iodine;
$R_7$ and $R_8$ are the same or different and each independently selected from the group consisting of methyl, ethyl, isopropyl, sec-butyl, tert-butyl, substituted or unsubstituted cyclohexyl, substituted or unsubstituted phenyl, substituted or unsubstituted biphenyl and substituted or unsubstituted naphthyl; or
$R_7$ and $R_8$ taken together with the carbon atom to which they are attached to form a $(C_3-C_7)$carbocyclic ring optionally containing one or more heteroatoms selected from the group consisting of nitrogen, oxygen and sulfur;
$Ar_1$ and $Ar_2$ are the same or different and each independently selected from the group consisting of substituted or unsubstituted phenyl, substituted or unsubstituted biphenyl and substituted or unsubstituted naphthyl;
c) an organo-ruthenium compound of formula (III):

$((R_9)_3P)_3RuCl_2$ (III)

wherein
$R_9$ is selected from the group consisting of substituted or unsubstituted phenyl and substituted or unsubstituted cyclohexyl; and d) a compound of formula (IV) or a compound of formula (V):

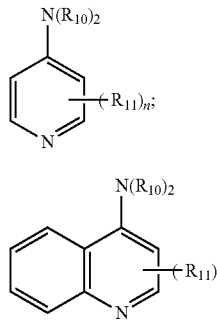

wherein n is an integer from 0 to 4;

each $R_{10}$ is independently selected from the group consisting of methyl, ethyl, n-propyl, iso-propyl, n-butyl, iso-butyl and tert-butyl;

$R_{11}$ is selected from the group consisting of methyl, ethyl, linear or branched $(C_3-C_6)$alkyl, $(C_6-C_{10})$aryl, methoxy, ethoxy, linear or branched $(C_3-C_6)$alkoxy, $(C_6-C_{10})$aryloxy and halogen;

wherein said substituents are selected from the group consisting of methyl, ethyl, iso-propyl, tert-butyl and phenyl; and wherein said monomer of formula (I) is having a refractive index of at least 1.5 and said composition is in a clear liquid form at room temperature and wherein said composition exhibits no viscosity change when stored at temperatures below 35° C. for a period of at least four (4) days.

2. The composition according to claim 1, wherein said composition comprises first and second monomer of formula (I) distinct from each other and one of said first and second monomers having a refractive index of at least 1.5 and viscosity below 100 centipoise, and wherein said first monomer is completely miscible with said second monomer to form a clear solution.

3. The composition according to claim 1, wherein said composition forms a substantially transparent film when heated to a temperature from 80° C. to 150° C.

4. The composition according to claim 3, wherein said film has a transmission of equal to or higher than 90 percent of visible light.

5. The composition according to claim 3, wherein said film has a transmission of equal to or higher than 95 percent of visible light.

6. The composition according to claim 1, wherein the monomer of formula (I) is selected from the group consisting of:

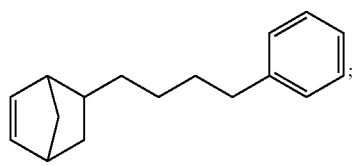

5-(4-phenylbutyl)bicyclo[2.2.1]hept-2-ene

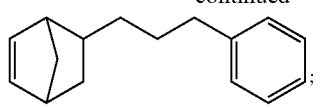

5-(3-phenylpropyl)bicyclo[2.2.1]hept-2-ene

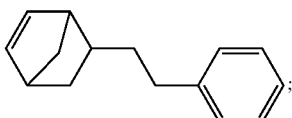

5-phenethylbicyclo[2.2.1]hept-2-ene (PENB)

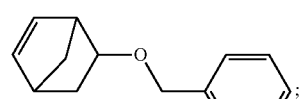

5-(benzyloxy)bicyclo[2.2.1]hept-2-ene

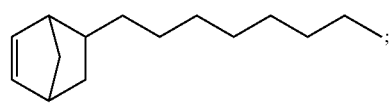

5-octylbicyclo[2.2.1]hept-2-ene (OctNB)

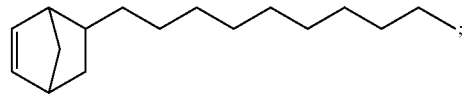

5-decylbicyclo[2.2.1]hept-2-ene (DecNB)

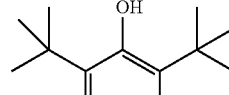

4,4'-(bicyclo[2.2.1]hept-5-en-2-ylmethylene)bis(2,6-di-tert-butylphenol) (AOAONB)

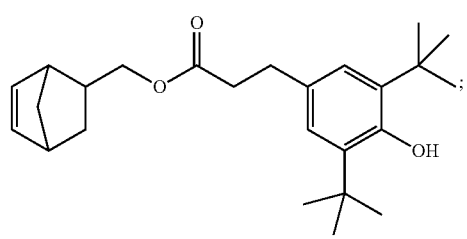

bicyclo[2.2.1]hept-5-en-2-ylmethyl 3-(3,5-di-tert-butyl-4-hydroxyphenyl)propanoate (AONB)

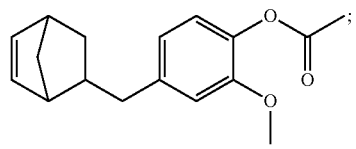

5-norbornenylmethyleugenyl acetate (EuAcNB)

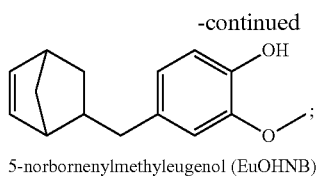

5-norbornenylmethyleugenol (EuOHNB)

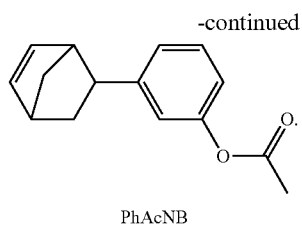

PhAcNB

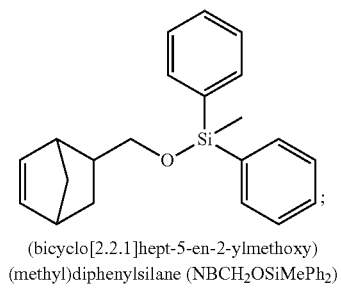

(bicyclo[2.2.1]hept-5-en-2-ylmethoxy)
(methyl)diphenylsilane (NBCH₂OSiMePh₂)

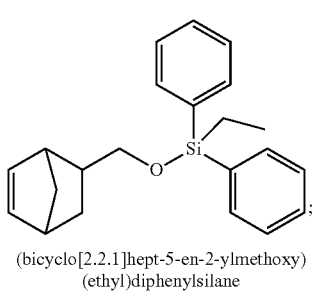

(bicyclo[2.2.1]hept-5-en-2-ylmethoxy)
(ethyl)diphenylsilane

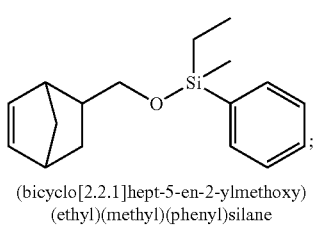

(bicyclo[2.2.1]hept-5-en-2-ylmethoxy)
(ethyl)(methyl)(phenyl)silane

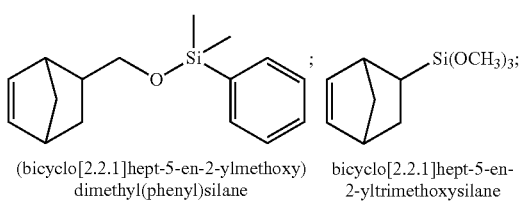

(bicyclo[2.2.1]hept-5-en-2-ylmethoxy)    bicyclo[2.2.1]hept-5-en-
dimethyl(phenyl)silane                    2-yltrimethoxysilane
                                                  (TMSNB)

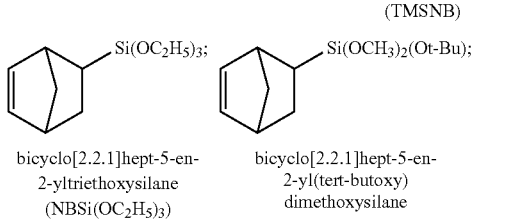

bicyclo[2.2.1]hept-5-en-    bicyclo[2.2.1]hept-5-en-
2-yltriethoxysilane         2-yl(tert-butoxy)
(NBSi(OC₂H₅)₃)              dimethoxysilane

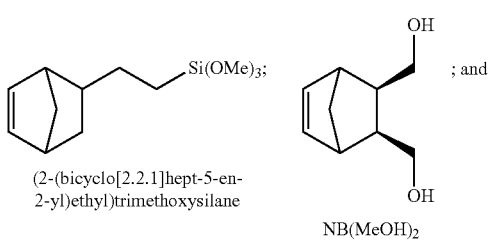

(2-(bicyclo[2.2.1]hept-5-en-
2-yl)ethyl)trimethoxysilane        NB(MeOH)₂    ; and 7. The composition according to claim 1, wherein in the organo-ruthenium compound of formula (II):

X is chlorine;

$R_7$ and $R_8$ are the same or different and each independently selected from the group consisting of methyl, ethyl, isopropyl and cyclohexyl; or $R_7$ and $R_8$ taken together with the carbon atom to which they are attached to form a cyclopentyl, cyclohexyl or cycloheptyl ring;

$Ar_1$ and $Ar_2$ are the same or different and each independently selected from the group consisting of phenyl, 2,6-dimethylphenyl, 2,6-diethylphenyl, 2,6-di(isopropyl)phenyl and 2,4,6-trimethylphenyl.

8. The composition according to claim 7, wherein the organo-ruthenium compound of formula (II) is selected from the group consisting of:

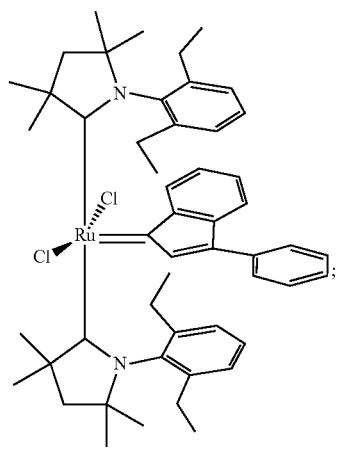

bis(1-(2,6-diethylphenyl)-3,3,5,5-
tetramethylpyrrolidin-2-yl)
(3-phenyl-1H-inden-1-
ylidene)ruthenium(VI) chloride -continued

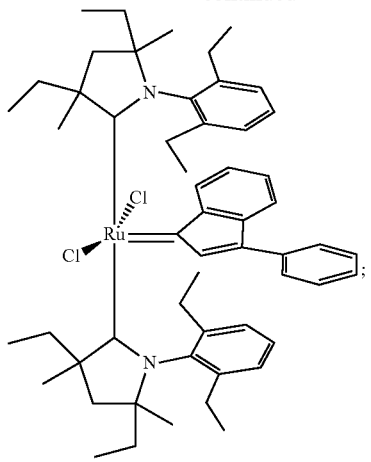

((3R,5R)-1-(2,6-diethylphenyl)-3,5-diethyl-3,5-
dimethylpyrrolidin-2-yl)((3S,5S)-1-(2,6-
diethylphenyl)-3,5-diethyl-3,5-
dimethylpyrrolidin-2-yl)((E)-3-phenyl-
1H-inden-1-ylidene)ruthenium(VI) chloride

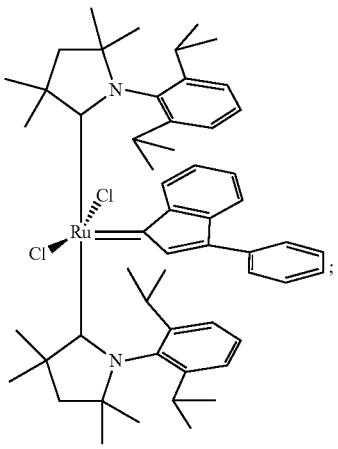

bis(1-(2,6-diisopropylphenyl)-3,3,5,5-
tetramethylpyrrolidin-2-yl)
(3-phenyl-1H-inden-
1-ylidene)ruthenium(VI) chloride

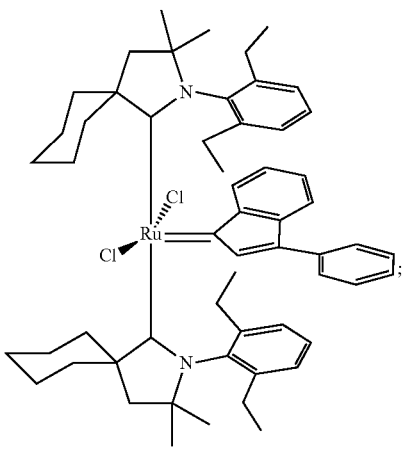

bis(2-(2,6-diethylphenyl)-3,3-dimethyl-2-azaspiro
[4.5]decan-1-yl)(3-phenyl-1H-inden-
1-ylidene)ruthenium(VI) chloride -continued

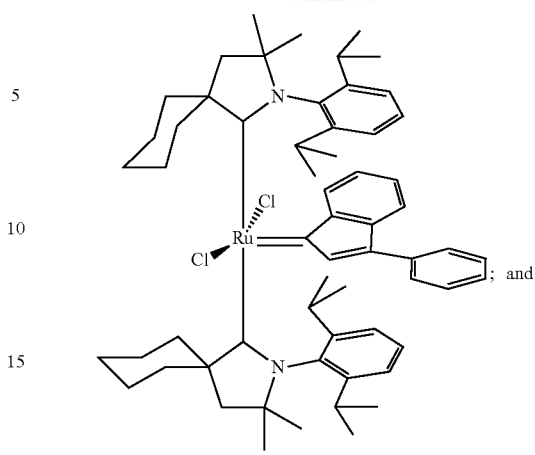

bis(2-(2,6-diisopropylphenyl)-3,3-dimethyl-2-azaspiro
[4.5]decan-1-yl)(3-phenyl-1H-inden-1-
ylidene)ruthenium(VI) chloride

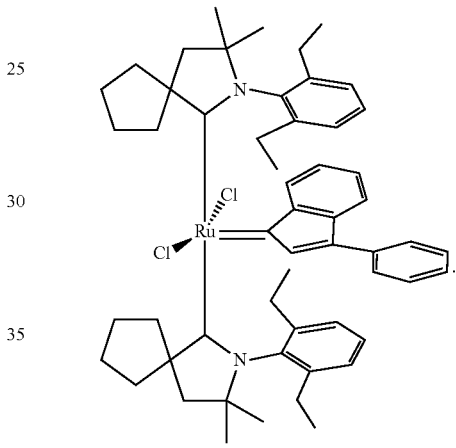

bis(2-(2,6-diethylphenyl)-3,3-dimethyl-2-azaspiro
[4.4]nonan-1-yl)(3-phenyl-1H-inden-
1-ylidene)ruthenium(VI) chloride

9. The composition according to claim 1, wherein in the organo-ruthenium compound of formula (III): $R_9$ is selected from the group consisting of phenyl, 4-methylphenyl, 4-ethylphenyl, 4-isopropylphenyl, 2,4-dimethylphenyl, 2,4,6-trimethylphenyl, cyclohexyl and 4-methylcyclohexyl.

10. The composition according to claim 1, wherein the organo-ruthenium compound of formula (III) is selected from the group consisting of:

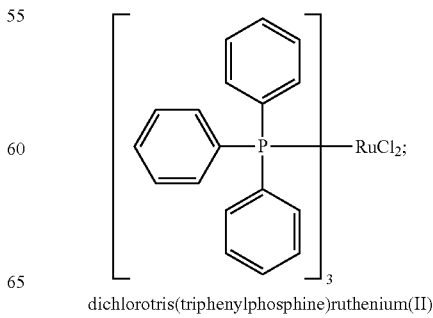

dichlorotris(triphenylphosphine)ruthenium(II)

-continued

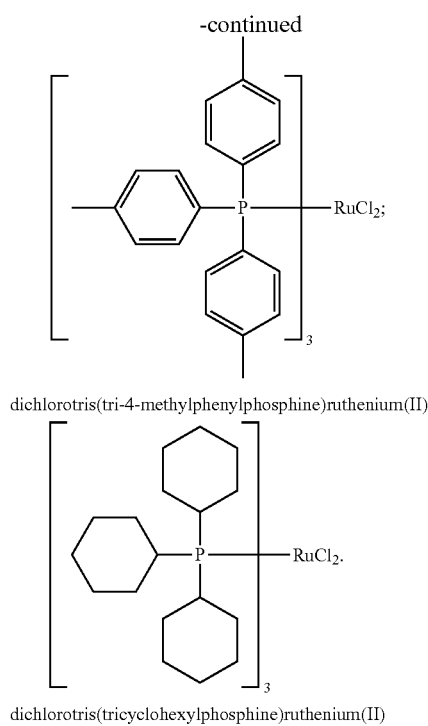

dichlorotris(tri-4-methylphenylphosphine)ruthenium(II)

dichlorotris(tricyclohexylphosphine)ruthenium(II)

11. The composition according to claim 1, wherein in the compound of formula (IV):
n is an integer from 0 to 2;
each $R_{10}$ is independently selected from the group consisting of methyl, ethyl, iso-propyl and tert-butyl; and
$R_{11}$ is selected from the group consisting of methyl, ethyl, iso-propyl, tert-butyl, phenyl, methoxy, ethoxy, phenoxy, fluorine and chlorine.

12. The composition according to claim 1, wherein the compound of formula (IV) is selected from the group consisting of:
N,N-dimethylpyridin-4-amine;
N,N-diethylpyridin-4-amine;
N,N-diisopropylpyridin-4-amine;
N,N-di-tert-butylpyridin-4-amine;
N,N-dimethyl-2-methylpyridin-4-amine;
N,N-di-tert-butyl-2-methylpyridin-4-amine;
2-methoxy-N,N-dimethylpyridin-4-amine;
2-fluoro-N,N-dimethylpyridin-4-amine;
N,N-dimethylquinolin-4-amine;
N,N,2-trimethylquinolin-4-amine;
2-methoxy-N,N-dimethylquinolin-4-amine; and
2-chloro-N,N-dimethylquinolin-4-amine.

13. A composition comprising:
a) one or more monomers of formula (I):

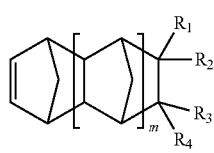
(I)

wherein:
m is an integer 0, 1 or 2;
$R_1$, $R_2$, $R_3$ and $R_4$ are the same or different and each independently selected from the group consisting of hydrogen, halogen, methyl, ethyl, linear or branched $(C_3-C_{16})$alkyl, perfluoro$(C_1-C_{12})$alkyl, hydroxy$(C_1-C_{16})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl, tri$(C_1-C_6)$alkoxysilyl and a group of formula (A):

—Z-Aryl    (A)

wherein:
Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$, $(CR_5R_6)_a$—$(CO)$—$(CR_5R_6)_b$, where a and b are integers which may be the same or different and each independently is 1 to 12;
$R_5$ and $R_6$ are the same or different and each independently selected from the group consisting of hydrogen, methyl ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;
Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy;
b) an organo-ruthenium compound of formula (II):

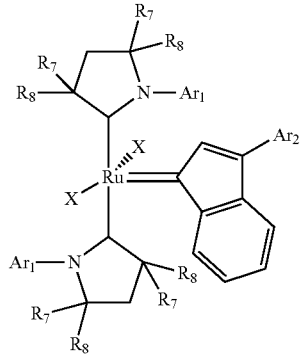
(II)

wherein
X is a halogen selected from the group consisting of chlorine, bromine and iodine;
$R_7$ and $R_8$ are the same or different and each independently selected from the group consisting of methyl, ethyl, isopropyl, sec-butyl, tert-butyl, substituted or unsubstituted cyclohexyl, substituted or unsubstituted phenyl, substituted or unsubstituted biphenyl and substituted or unsubstituted naphthyl; or
$R_7$ and $R_8$ taken together with the carbon atom to which they are attached to form a $(C_3-C_7)$carbocyclic ring optionally containing one or more heteroatoms selected from the group consisting of nitrogen, oxygen and sulfur;
$Ar_1$ and $Ar_2$ are the same or different and each independently selected from the group consisting of substituted or unsubstituted phenyl, substituted or unsubstituted biphenyl and substituted or unsubstituted naphthyl;

c) optionally an organo-ruthenium compound of formula (III):

$$((R_9)_3P)_3RuCl_2 \qquad (III)$$

wherein $R_9$ is selected from the group consisting of substituted or unsubstituted phenyl and substituted or unsubstituted cyclohexyl; and d) a compound of formula (IV) or a compound of formula (V):

(IV)

(V)

wherein n is an integer from 0 to 4;

each $R_{10}$ is independently selected from the group consisting of methyl, ethyl, n-propyl, iso-propyl, n-butyl, iso-butyl and tert-butyl;

$R_{11}$ is selected from the group consisting of methyl, ethyl, linear or branched $(C_3\text{-}C_6)$alkyl, $(C_6\text{-}C_{10})$aryl, methoxy, ethoxy, linear or branched $(C_3\text{-}C_6)$alkoxy, $(C_6\text{-}C_{10})$aryloxy and halogen;

wherein said substituents are selected from the group consisting of methyl, ethyl, iso-propyl, tert-butyl and phenyl; and e) a dispersion comprising nanoparticles and wherein said composition exhibits no viscosity change when stored at temperatures below 35° C. for a period of at least for (4) days.

14. The composition according to claim 13, wherein said nanoparticles comprised of at least one of hafnium oxide, zirconium oxide, titanium oxide, hafnium-zirconium oxide, and titanium-zirconium oxide.

15. A kit for forming a substantially transparent film comprising:

a) one or more monomers of formula (I):

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched $(C_3\text{-}C_{16})$alkyl, perfluoro$(C_1\text{-}C_{12})$alkyl, hydroxy$(C_1\text{-}C_{16})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_6)$alkyl, perfluoro$(C_6\text{-}C_{10})$aryl, perfluoro$(C_6\text{-}C_{10})$aryl $(C_1\text{-}C_3)$alkyl, tri$(C_1\text{-}C_6)$alkoxysilyl and a group of formula (A):

$$—Z\text{-Aryl} \qquad (A)$$

wherein:

Z is a bond or a group selected from the group consisting of:
$(CR_5R_6)_a$, $O(CR_5R_6)_a$, $(CR_5R_6)_aO$, $(CR_5R_6)_a—O—(CR_5R_6)_b$, $(CR_5R_6)_a—O—(SiR_5R_6)_b$, $(CR_5R_6)_a—(CO)O—(CR_5R_6)_b$, $(CR_5R_6)_a—O(CO)—(CR_5R_6)_b$, $(CR_5R_6)_a—(CO)—(CR_5R_6)_b$, where a and b are integers which may be the same or different and each independently is 1 to 12;

$R_5$ and $R_6$ are the same or different and each independently selected from the group consisting of hydrogen, methyl ethyl, linear or branched $(C_3\text{-}C_6)$alkyl, hydroxy, methoxy, ethoxy, linear or branched $(C_3\text{-}C_6)$alkyloxy, acetoxy, $(C_2\text{-}C_6)$acyl, hydroxymethyl, hydroxyethyl, linear or branched hydroxy$(C_3\text{-}C_6)$ alkyl, phenyl and phenoxy;

Aryl is phenyl or phenyl substituted with one or more of groups selected from the group consisting of methyl, ethyl, linear or branched $(C_3\text{-}C_6)$alkyl, hydroxy, methoxy, ethoxy, linear or branched $(C_3\text{-}C_6)$alkyloxy, acetoxy, $(C_2\text{-}C_6)$acyl, hydroxymethyl, hydroxyethyl, linear or branched hydroxy$(C_3\text{-}C_6)$alkyl, phenyl and phenoxy;

b) an organo-ruthenium compound of formula (II):

(II)

wherein

X is a halogen selected from the group consisting of chlorine, bromine and iodine;

$R_7$ and $R_8$ are the same or different and each independently selected from the group consisting of methyl, ethyl, isopropyl, sec-butyl, tert-butyl, substituted or unsubstituted cyclohexyl, substituted or unsubstituted phenyl, substituted or unsubstituted biphenyl and substituted or unsubstituted naphthyl; or $R_7$ and $R_8$ taken together with the carbon atom to which they are attached to form a $(C_3\text{-}C_7)$carbocyclic ring optionally containing one or more heteroatoms selected from the group consisting of nitrogen, oxygen and sulfur;

$Ar_1$ and $Ar_2$ are the same or different and each independently selected from the group consisting of substituted or unsubstituted phenyl, substituted or unsubstituted biphenyl and substituted or unsubstituted naphthyl;

c) optionally an organo-ruthenium compound of formula (III):

$$((R_9)_3P)_3RuCl_2 \quad (III)$$

wherein
$R_9$ is selected from the group consisting of substituted or unsubstituted phenyl and substituted or unsubstituted cyclohexyl; and
d) a compound of formula (IV) or a compound of formula (V):

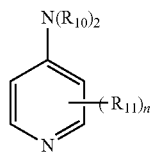

(IV)

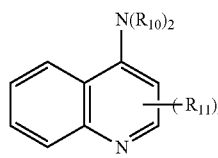

(V)

wherein
n is an integer from 0 to 4;
each $R_{10}$ is independently selected from the group consisting of methyl, ethyl, n-propyl, iso-propyl, n-butyl, iso-butyl and tert-butyl;
$R_{11}$ is selected from the group consisting of methyl, ethyl, linear or branched $(C_3-C_6)$alkyl, $(C_6-C_{10})$aryl, methoxy, ethoxy, linear or branched $(C_3-C_6)$alkoxy, $(C_6-C_{10})$aryloxy and halogen;

wherein said substituents are selected from the group consisting of methyl, ethyl, iso-propyl, tert-butyl and phenyl and wherein a composition of said kit exhibits no viscosity change when stored at temperatures below 35° C. for a period of at least four (4) days.

16. The kit according to claim 15, which further contains a dispersion comprising nanoparticles wherein said nanoparticles comprised of at least one of hafnium oxide, zirconium oxide, hafnium-zirconium oxide and titanium-zirconium oxide.

17. The kit according to claim 15, which contains:
5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(2-(2,6-diethylphenyl)-3,3-dimethyl-2-azaspiro[4.5]decan-1-yl)(3-phenyl-1H-inden-1-ylidene)ruthenium(VI) chloride, dichlorotris(triphenylphosphine)ruthenium(II) and N,N-dimethylpyridin-4-amine; and
5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), bis(1-(2,6-diethylphenyl)-3,3,5,5-tetramethylpyrrolidin-2-yl)(3-phenyl-1H-inden-1-ylidene)ruthenium(VI) chloride, dichlorotris(triphenylphosphine) ruthenium(II) and N,N-dimethylpyridin-4-amine.

18. The kit according to claim 16, which contains 5-phenethylbicyclo[2.2.1]hept-2-ene (PENB), 5-norbornenylmethyl-eugenol (EuOHNB), bis(2-(2,6-diethylphenyl)-3,3-dimethyl-2-azaspiro[4.5]decan-1-yl)(3-phenyl-1H-inden-1-ylidene)ruthenium(VI) chloride, N,N-dimethylpyridin-4-amine and zirconia nanoparticles having a size distribution less than 20 nm.

19. A film comprising the composition of claim 1.
20. A film comprising the composition of claim 13.

* * * * *